(12) United States Patent
Chivilikhin et al.

(10) Patent No.: US 8,951,485 B2
(45) Date of Patent: Feb. 10, 2015

(54) DEVICES AND METHODS FOR MICROREACTOR FLUID DISTRIBUTION

(75) Inventors: Mikhail Sergeevich Chivilikhin, St. Petersburg (RU); Sylvain Maxime F Gremetz, Montereau Fault Yonne (FR); Roland Guidat, Blennes (FR); Elena Daniela Lavric, Avon (FR); Olivier Lobet, Mennecy (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 775 days.

(21) Appl. No.: 12/623,712

(22) Filed: Nov. 23, 2009

(65) Prior Publication Data

US 2010/0132801 A1 Jun. 3, 2010

(30) Foreign Application Priority Data

Nov. 28, 2008 (EP) .................................... 08305873
Apr. 30, 2009 (EP) .................................... 09305384

(51) Int. Cl.
*B01J 8/00* (2006.01)
*B01J 19/00* (2006.01)
*B01F 5/06* (2006.01)
(Continued)

(52) U.S. Cl.
CPC ........... *B01J 19/0093* (2013.01); *B01F 5/0646* (2013.01); *B01F 5/0647* (2013.01); *B01F 13/0059* (2013.01); *B01F 15/065* (2013.01); *B01J 19/2485* (2013.01); *B01J 2219/00783* (2013.01); *B01J 2219/00824* (2013.01); *B01J 2219/00831* (2013.01); *B01J 2219/00869* (2013.01); *B01J 2219/00891* (2013.01); *B01J 2219/00959* (2013.01); *B01L 3/5025* (2013.01); *B01L 2300/087* (2013.01); *B01L 2300/0887* (2013.01); *B01L 2300/185* (2013.01); *B01L 2400/082* (2013.01)
USPC .......................................... 422/603; 422/552

(58) Field of Classification Search
USPC ........................................ 422/603, 552, 554
See application file for complete search history.

(56) References Cited

U.S. PATENT DOCUMENTS

2002/0124896 A1* 9/2002 O'Connor et al. ............ 137/833
2002/0185183 A1* 12/2002 O'Connor et al. ............ 137/814
(Continued)

FOREIGN PATENT DOCUMENTS

EP      1839740 A2    10/2007
EP      1854536 A1    11/2007
(Continued)

OTHER PUBLICATIONS

Elena D. Lavric, "Thermal Performance of Corning Glass Microstructures," ECI International Conference on Heat Transfer and Fluid Flow in Microscale Whistler, Sep. 21-26, 2008.

*Primary Examiner* — Natalia Levkovich
(74) *Attorney, Agent, or Firm* — Gregory V. Bean

(57) ABSTRACT

A microreactor includes a plurality of interconnected microstructures arranged in m process units with the process units configured to be operable together in parallel. Each of the m process units has a number n of respective process fluid inlets, wherein a number y of the n respective process fluid inlets are connected individually to respective non-manifolded fluid pumps, and wherein a number n minus y of the n respective process fluid inlets are connected to a respective manifolded fluid pump via a manifold, wherein y is an integer from 1 to n−1 inclusive.

14 Claims, 11 Drawing Sheets

(51) Int. Cl.
  *B01F 13/00* (2006.01)
  *B01F 15/06* (2006.01)
  *B01J 19/24* (2006.01)
  *B01L 3/00* (2006.01)

(56) References Cited

U.S. PATENT DOCUMENTS

| | | | |
|---|---|---|---|
| 2004/0136873 A1 | 7/2004 | Meier et al. | 422/402 |
| 2004/0136878 A1 | 7/2004 | Meier et al. | 422/102 |
| 2005/0245628 A1 | 11/2005 | Hubel et al. | 521/137 |
| 2006/0006065 A1 | 1/2006 | Pinkas et al. | 204/451 |
| 2007/0209574 A1 | 9/2007 | Hansen et al. | 117/68 |
| 2008/0081005 A1 | 4/2008 | Suzuki et al. | 422/105 |
| 2008/0226516 A1 | 9/2008 | Suzuki et al. | 422/188 |

FOREIGN PATENT DOCUMENTS

| | | |
|---|---|---|
| WO | WO2004/110608 | 12/2004 |
| WO | WO2007/127322 | 11/2007 |
| WO | WO2007/149793 | 12/2007 |
| WO | WO2008/121390 A1 | 10/2008 |

* cited by examiner

DEVICES AND METHODS FOR MICROREACTOR FLUID DISTRIBUTION

PRIORITY

This application claims priority to European Patent Application number 08305873.5, filed Nov. 28, 2008, titled "Devices and Methods For Microreactor Fluid Distribution" and European Patent Application number 09305384.1, filed Apr. 30, 2009, titled "Devices and Methods For Microreactor Fluid Distribution"

BACKGROUND

This application relates to devices and methods for fluid distribution within a microreactor, and more particularly to devices and methods for providing desired flows of both process fluids and thermal control fluids, particularly in microreactors employing microstructures comprising glass, ceramic, and glass-ceramic.

SUMMARY

According to one aspect of the invention, a microreactor includes a plurality of interconnected microstructures arranged in m process units with the process units configured to be operable together in parallel. Each of the m process units has a number n of respective process fluid inlets, wherein a number y of the n respective process fluid inlets are connected individually to respective non-manifolded fluid pumps and wherein a number n minus y of the n respective process fluid inlets are connected to a respective manifolded fluid pump via a manifold, wherein y is an integer from 1 to n−1 inclusive.

Additional variations and features of the present invention are described below in connection with the figures, of which:

DETAILED DESCRIPTION

Figure 1:
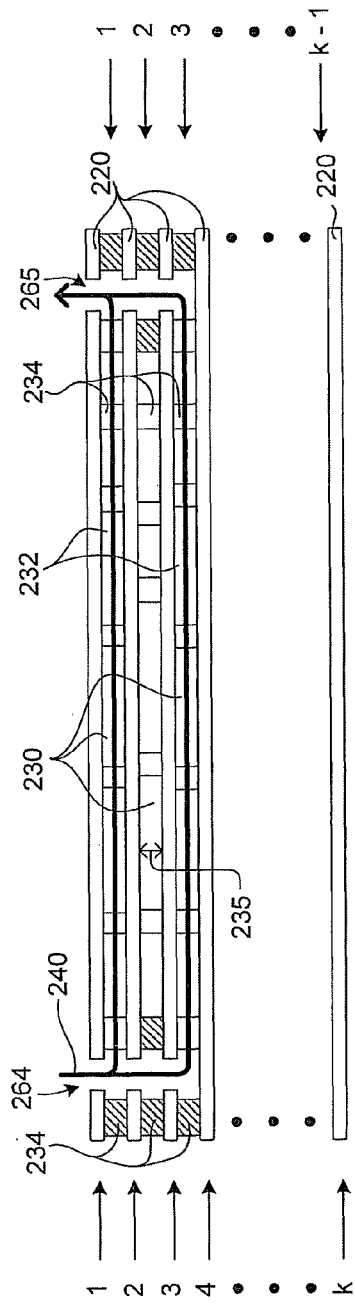
FIG. 1 is cross section of a microstructure 14 in the form of a layered microfluidic device 210.

Whenever possible, the same reference numerals will be used throughout the drawings to refer to the same or like parts. Features described as desirable are preferred but optional, representative of variations of the invention.

Within this document, "unitary microstructure" refers to single-piece or otherwise generally permanently assembled microfluidic devices having internal passages with a characteristic cross-sectional dimension in the few-millimeter to sub-millimeter range. Unitary microstructures may include, for instance, devices similar to and including those disclosed and described in U.S. Pat. No. 7,007,709 entitled "A Microfluidic Device and Manufacture Thereof," whether made by the method therein disclosed or other methods. Unitary microstructures may also include devices similar and including those disclosed and described in Publication No. WO2008/121390 entitled "Extruded Body Devices and Methods for Fluid Processing," whether made by the methods disclosed or by other methods. "Microstructure" refers to both unitary and other microstructures and to combinations of microstructures joined or interconnected in close proximity, treated or treatable as a unit for fluid distribution. "Microreactor" refers to a device for performing chemical or physical processes or combinations thereof, the device including, in the context of this document, two or more microstructures with associated fluid connections arranged in one or more production units. "Production unit" refers to a combination of microstructures with associated fluid connections arranged to as to be capable of performing a desired reaction or process along a single primary path along or through the microstructures, and not along multiple parallel primary paths through multiple microstructures in parallel. "Flow balance" or "flow balancing" relates to achieving any particular desired flow ratio between or among multiple fluid feeds, and not merely to equal flows.

FIG. 1 is cross section of one instance of a microstructure 14 in the form of a unitary microstructure or unitary multi-layer microfluidic device 210 which may be used with the present invention. The microfluidic device 210 may be comprised of multiple substrates 220, generally at least four as shown at the top of the figure, but more may be included if desired, up to "k" total, as labeled at the left edge of FIG. 1. Between each adjacent pair of the multiple substrates 220, a layer 230 of the device 210 is defined, such that multiple layers 230 are present, generally at least three, and optionally more, with up to k−1 total layers, as labeled at the right edge of FIG. 1. The substrates 220 are joined to each other and supported relative to one another by walls 234 (for ease of viewing, not all labeled), some of which are cut by the cross section of the figure, as indicated by the cross-hatching. Inlet and outlet holes 264, 265 which may extend through one or more of the substrates 220, provide external access to a thermal control fluid path 240 defined in or through one or more of the layers 230, in this case through the two layers 232 of the layers 230. Alternative access routes, such as by holes or gaps (not shown) through walls 234, may be used in place of or in addition to holes 264, if desired.

Figure 2:
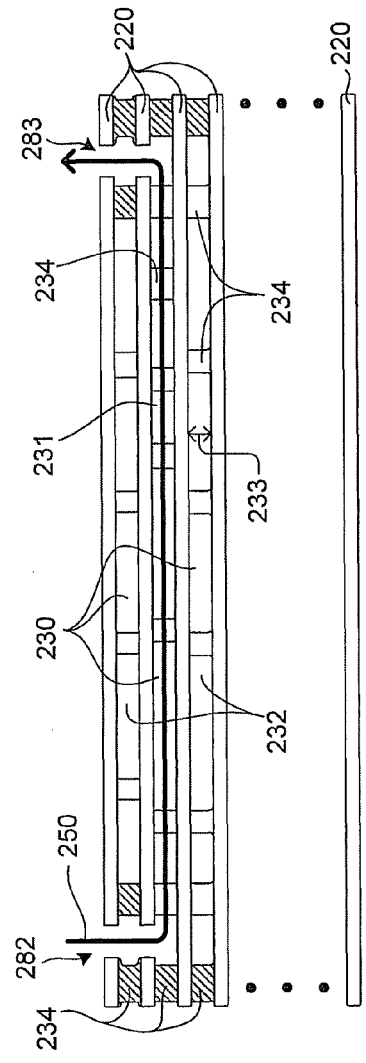
FIG. 2 is another cross section of the microstructure 14 of FIG. 1.

FIG. 2 is another cross section of the microstructure 14 or microfluidic device 210 of FIG. 1, taken in a plane different from but parallel to that of FIG. 1. In the cross section of FIG. 2 may be seen inlet and outlet holes 282, 283 which provide access through substrates 220 to a process fluid path 250 defined through one or more of the layers 230 of the device, in this case through the one layer 231. The process fluid path 250 may include one or more additional inlet ports or holes 282 (in a cross section not shown in FIGS. 1 and 2), such that two or more process fluids can be contacted and/or mixed and/or reacted together within the process fluid path 250. More than one outlet port or hole 283 may also be included on the output end of the process fluid path 250, such that a process fluid may be divided upon exiting the device 210, if desired.

Various materials and methods may be used to form the microstructures 14 or microfluidic devices 210 of the type shown in FIGS. 1 and 2, including methods that produce walls and substrates simultaneously as one piece. Additional methods include, for instance, those disclosed and described in Patent Publication No. EP1964817, entitled "Method for Making Microfluidic Devices and Devices Produced Thereof," and in Patent Publication No. US2007/0154666, entitled "Powder Injection Molding of Glass and Glass-Ceramics."

Figures 3, 4:
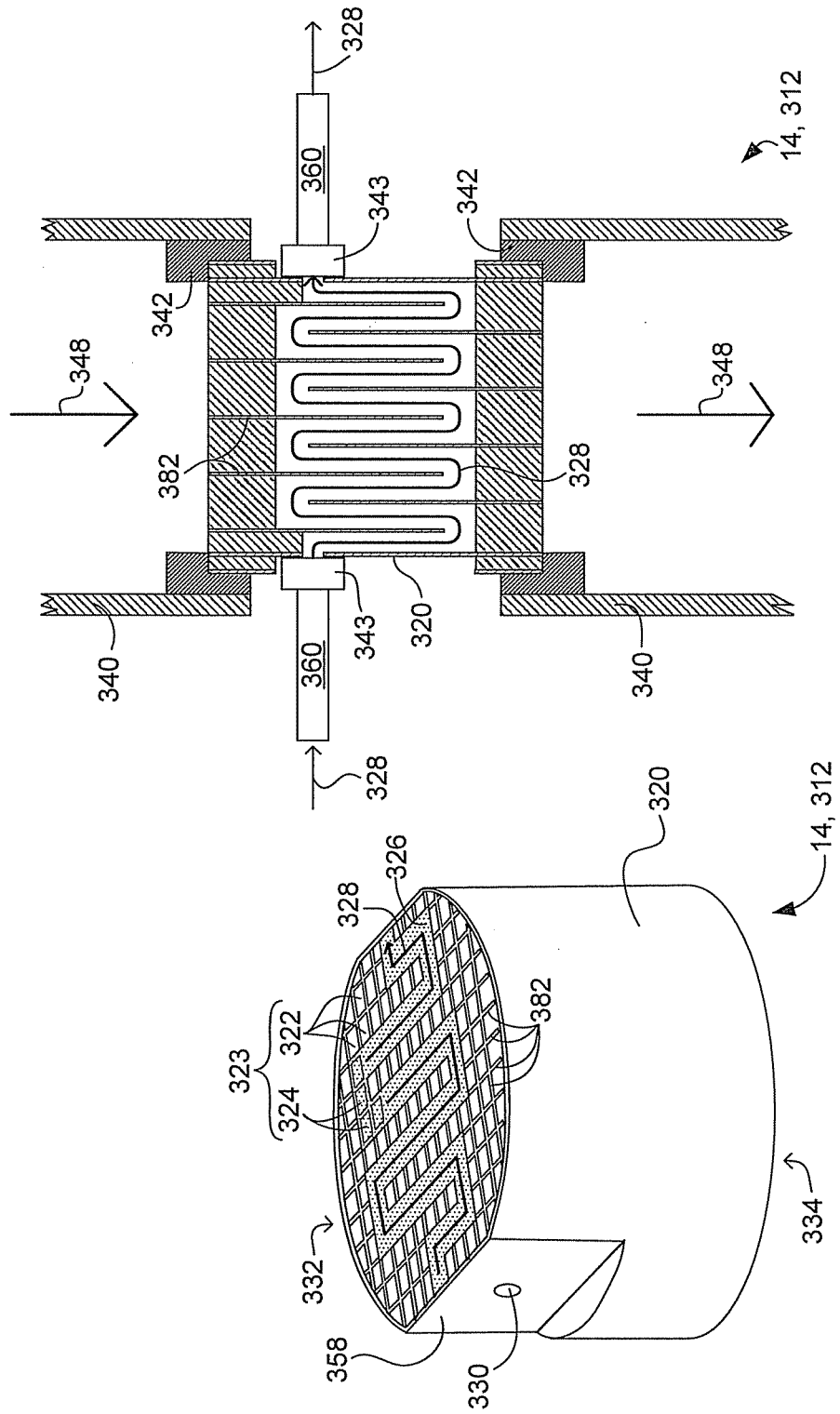
FIG. 3 is a perspective view of another instance of a microstructure 14 in the form of a honeycomb-body based unitary microfluidic device 312.
FIG. 4 is a cross-sectional view of a microstructure 14 in the form of a honeycomb body microfluidic device 312 similar to that of FIG. 3, with fluid connections.

FIG. 3 is a perspective view of another instance of a microstructure 14 that may be used in the context of the present invention, in the form of a honeycomb-body based unitary microfluidic device 312.

The microfluidic device 312 comprises a honeycomb body 320. The body 320 has cells 323 extending in parallel in a common direction from a first end 332 of the body 320 to a second end 334, divided by walls 382. The cells 323 include a first plurality of cells 322 open at both ends of the body and a second plurality of cells 324 closed at one or both ends of the body by one or more plugs 326 or by a more or less continuous plugging material 326 disposed at or near the end of the body and optionally at least partly within the cells 324, or by other suitable means. The second plurality of cells 324 (the closed cells) contain, at least in part, one or more a passages 328 extending through the body 320. The passage 328 may have a serpentine shape when considered in a plane perpendicular to the common direction of the cells 323, as shown in FIG. 3, but other passage shapes may also be used. More than one passage 328 per body 20 may also be used, if desired.

FIG. 4 is a cross-sectional view of a honeycomb body microstructure 14 in the form of a microfluidic device 312 similar to that of FIG. 3, but with a type of fluid connection also shown. In FIG. 4, a fluid housing 340 supports the honeycomb body 320 via seals 342. A passage 348, typically used for a thermal control fluid, is aimed in parallel through all the open channels 322 of the body 320, in cooperation with the housing 340. Passage 328 in the body 320 is accessed via conduits 360 through seals 343. As seen in the cross-section of FIG. 4, the path or passage 328 in the body 320 may also be serpentine in a plane parallel to the common direction of the cells 323, but other passage shapes may also be used.

The honeycomb body 320 is desirably formed of an extruded glass, glass-ceramic, or ceramic material for durability and chemical inertness. Alumina ceramic is generally preferred as having good strength, good inertness, and higher thermal conductivity than glass and some ceramics. Greater detail concerning general materials and fabrication procedures developed by the present inventor and/or colleagues of the present inventor may be found in the above-referenced PCT Publication No. WO 2008/121390.

Figure 6:
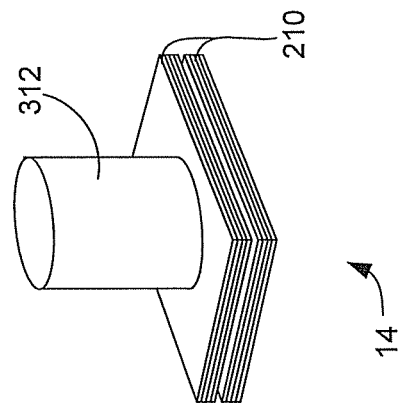
FIG. 6 is a perspective view of a hybrid or combination microstructure 14 including two multilayer microfluidic devices 210 and one honeycomb-body based microfluidic device 312.
Figure 5:
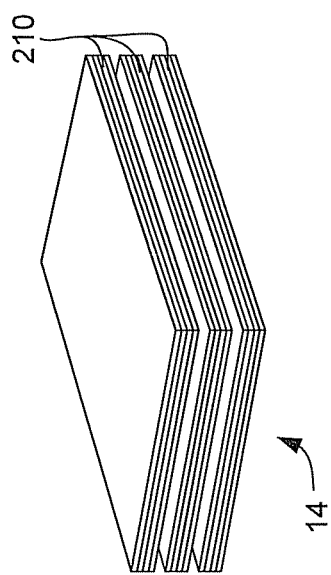
FIG. 5 is a perspective view of a microstructure 14 including three unitary microstructures in the faun of multiple multilayer microfluidic devices 210.

Unitary microstructures such as those shown in FIGS. 1-4 may also be combined to form hybrid or combination microstructures as shown in FIGS. 5 and 6. FIG. 5 shows a microstructure 14 including three unitary microstructures in the form of multilayer microfluidic devices 210, connected together physically and fluidically by any suitable means. FIG. 6 shows a hybrid or combination microstructure 14 including two multilayer microfluidic devices 210 and one honeycomb-body based microfluidic device 312.

As is understood in the field of microreaction technology, for many desirable applications of microreactor technology the production rate achievable in a single production unit, having a single primary path in or through a given set of microstructures, may be insufficient for commercial needs. This may be the case even where the microstructures in question utilize what is known as "internal numbering up" or internal parallelism in flow passages. For this reason, it is desirable to operate multiple production units of microstructures in parallel, that is, to use what is sometimes called "external numbering up."

An example of a mounting and interconnection system for fluidic microstructures, developed by the present inventors and/or their associates, may be found in Patent Publication No. EP1854543, assigned to the assignee of the present application. Such a system any other appropriate means may be employed to form various microreactor configurations by connecting microstructures in series and in parallel and in combinations of series and parallel arrangements.

For many processes, achieving external numbering up by replicating every part of a production unit, including multiple pumps for feeding multiple streams of process and thermal control fluids to each production unit, is not sufficiently economical. This may be appreciated from the microreactors 10 shown in FIGS. 7-9, each of which represents an instance of a microreactor 10 comprised of an interconnected network 12 of microstructures 14 together forming a single process unit 102 or a portion of a single process unit 102.

Figure 7:
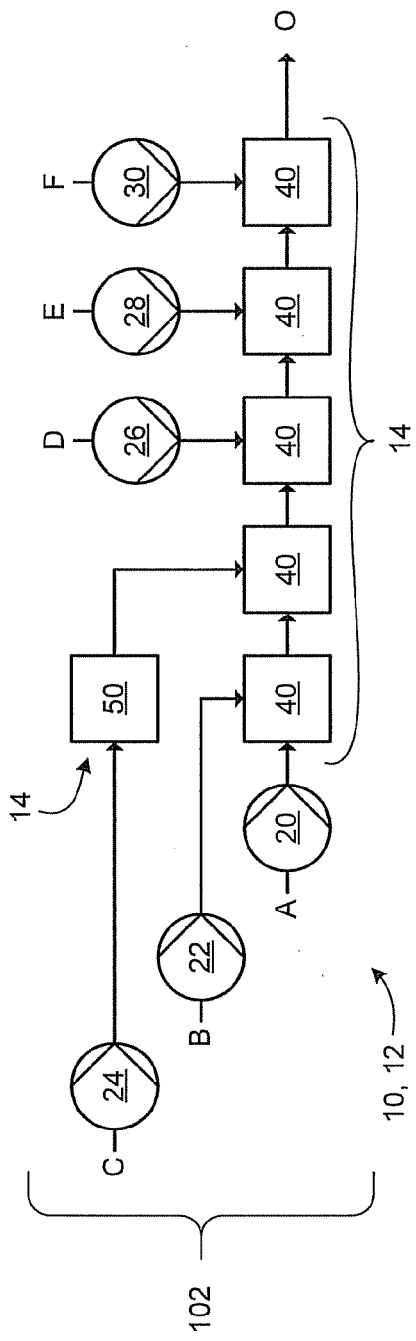
FIG. 7 is a schematic diagram of a microreactor 10 comprising multiple microstructures 14.
Figure 8:
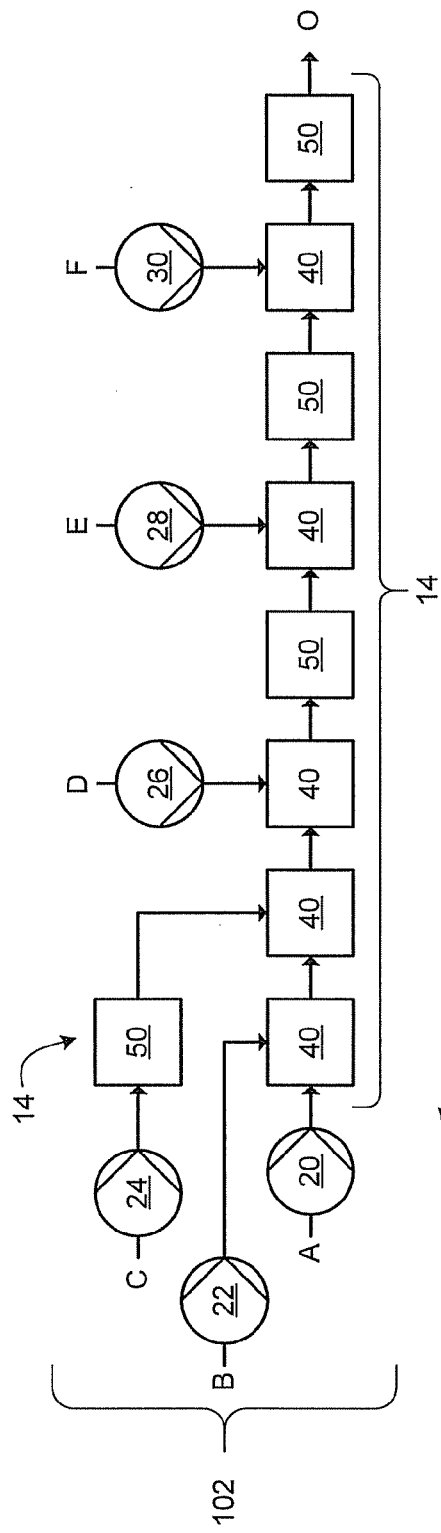
FIG. 8 is a schematic diagram of another microreactor 10 comprising multiple microstructures 14.

Schematic diagrams of two arrangements of a microreactor 10, among essentially infinite possible arrangements, are shown in FIGS. 7 and 8, in the form of an interconnected network 12 of microstructures 14. Each microstructure 14 typically, though not necessarily, includes both process fluid passages or paths and thermal control or thermal control fluid passages or paths therein, and is thus provided with one or more process fluid feeds and typically one (but possibly more) thermal control fluid feeds. In FIGS. 7 and 8, only process fluid feeds, the feeds of process fluids A-F, are shown. Thermal control fluid feeds are omitted from FIGS. 7 and 8 for ease of viewing.

Microstructures 14 may take the form of microstructures 40 having two or more process fluid inputs, such as mixing or contacting microstructures, and microstructures 50 having only one process fluid input, such as thermal control or dwell time or catalysis microstructures, or any of various other microstructures having various combinations of process fluid inputs and outputs. In the embodiment shown in FIG. 7, process fluid A is pumped by pump 20, and process fluid B is pumped by pump 22, directly into the first microstructure 40 where the fluids are combined and mixed. Process fluid C is pumped by pump 24 through microstructure 50 where the fluid is pre-heated or pre-cooled before entering the second microstructure 40 to be combined and mixed with the mixture or the product of mixing fluids A and B. Successive process fluids D, E and F are added similarly by pumps 26, 28 and 30, and the resulting fluid product is delivered at output O.

The microreactor of FIG. 8 is identical to that of FIG. 7 and may operate similarly, except that the microreactor is arranged such that after the addition and initial combination and mixing of each of the process fluids D, E, and F, the process fluid stream passes through a respective thermal microstructure 50, which provides additional dwell time and thermal control capability.

Figure 9:
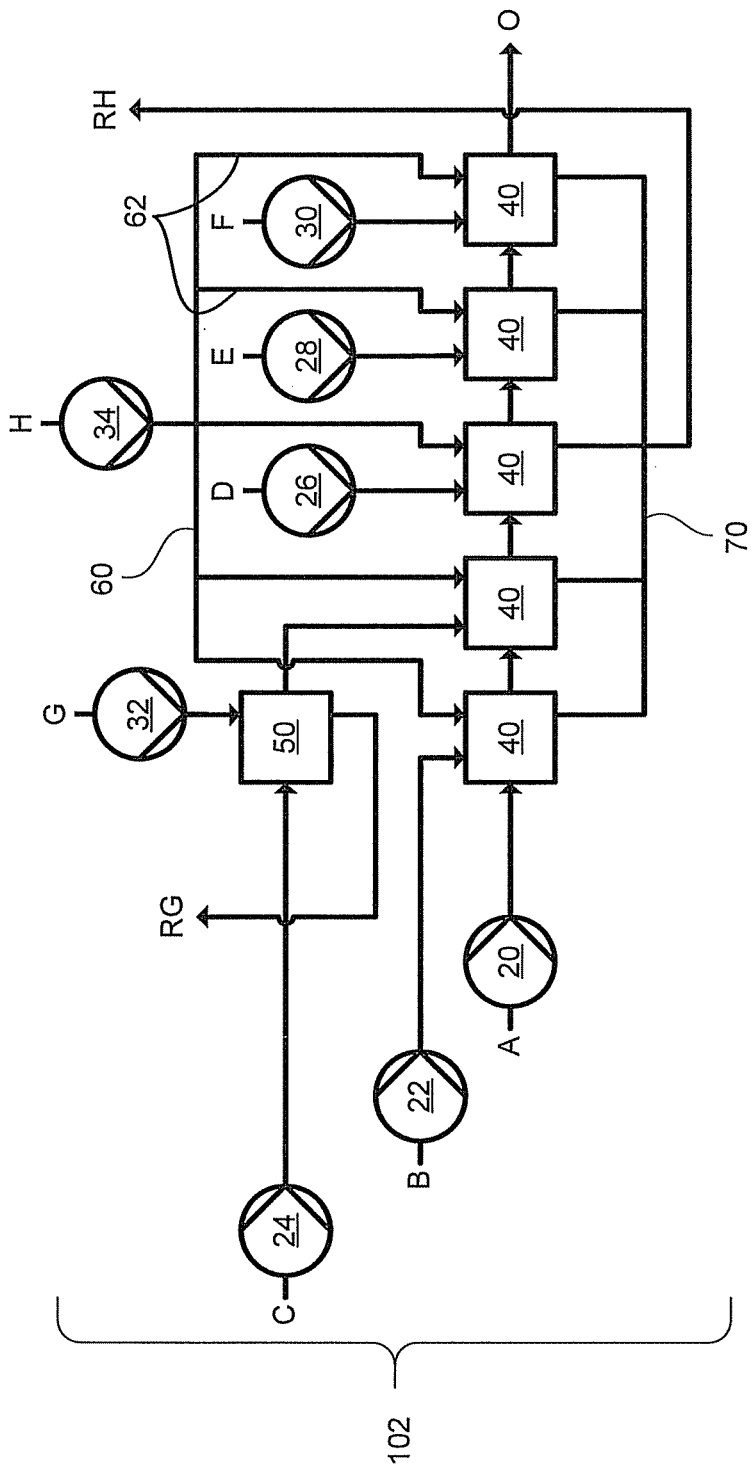
FIG. 9 is a schematic diagram of the microreactor 10 of FIG. 7, with both thermal control fluid and process fluid fluidic connections shown.

FIG. 9 shows the microreactor 10 of FIG. 7, but with thermal control fluid feeds added. Two or more thermal control fluids may be used. In this embodiment, two thermal control fluids G and H are used, allowing two different temperatures to be approached or maintained in the respective associated portions of the microreactor 10. Thermal control fluid G is fed by pump 32 through microstructure 50 and out to fluid return RG, where the fluid may be recycled back through the same loop, if desired, after any necessary heating or cooling. Thermal control fluid H is fed by a pump 34, but is fed via a manifold 60 with branches 62 into the five microstructures 40 in parallel. A collection manifold 70 collects and returns the thermal control fluid H at fluid return RH. Such parallel feeding of thermal control fluid is desirable, where possible, from efficiency, cost, and reliability considerations.

Where thermal fluid is fed in parallel, as by pump 34 in FIG. 9, each microstructure 40 so fed should receive the needed rate of flow of thermal control fluid. Inadequate thermal fluid flow can lead to poor reaction control or even out-of-control conditions.

The microreactor 10 of FIG. 9 constitutes only a single process unit 102—that is, a microreactor having a single principal process path in or through multiple microstructures—a process fluid path along which microstructures are not employed in parallel to form multiple principal process paths. In the microreactor of FIG. 9, a single process unit 102 has six process fluid feeds A-F and two thermal control fluid feeds G and H. Depending on the reaction to be performed, more process fluid feeds, more thermal control fluid feeds, and/or a more complicated network 12 of microstructures 14 may be required.

From FIG. 9 (and from FIG. 8, which is shown with thermal control fluid feeds omitted), it may be appreciated that a microreactor 10 consisting of only a single process unit 102 can be fairly complex. Nonetheless, to meet high production throughputs that may be required, multiple process units 102 are desirably operated in parallel. While replicating the entire process unit 102 in parallel is possible, various fluid connection and fluid handling components, pumps in particular, add to the cost, and replicating the eight pumps of FIG. 9 across multiple process units may be prohibitively expensive for many processes. Accordingly, it is desirable, to the degree possible, to operate multiple process units 102 in parallel from a single pump for each feed.

Figure 10:
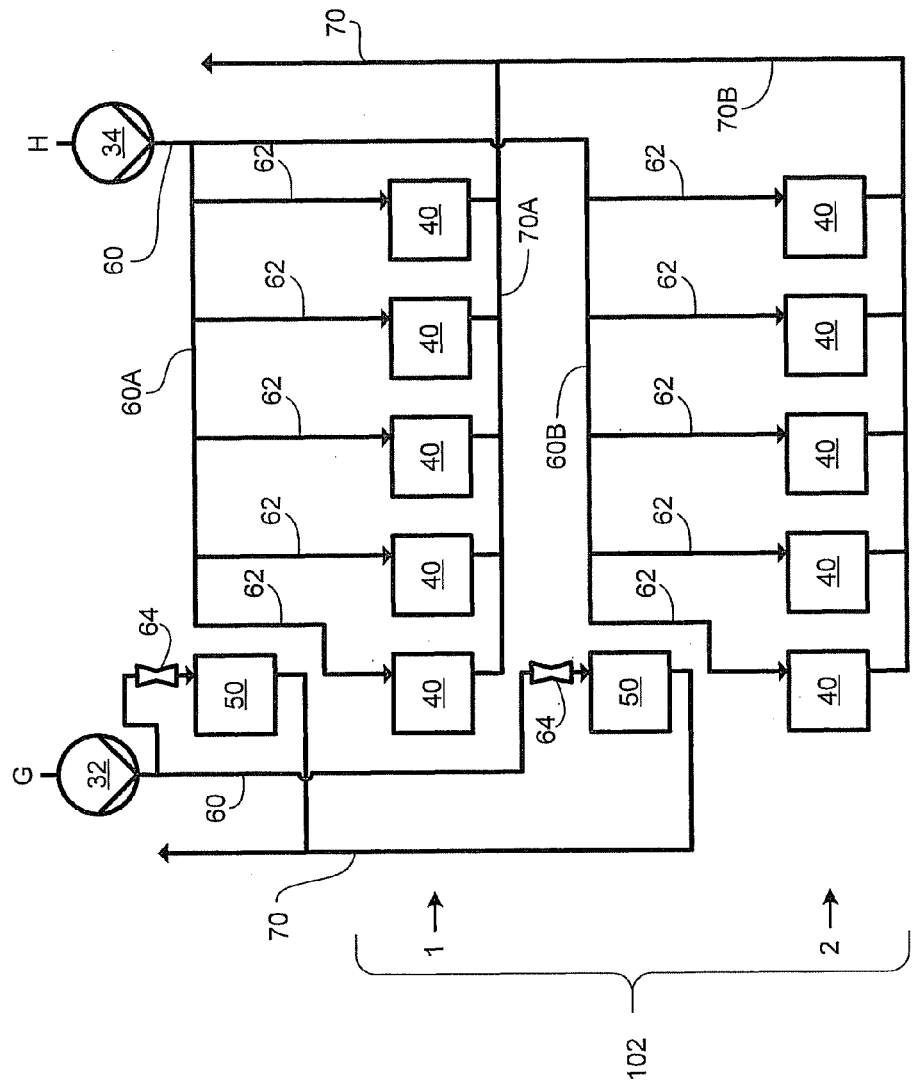
FIG. 10 is a schematic diagram of a microreactor or portion of a microreactor having two process units 102 and having a manifold 60 in the path of thermal control fluid H according to an aspect of the present invention.

To this end, where multiple process units 102 are used, the thermal control fluid feed may be manifolded across multiple process units if desired, in addition to being manifolded across multiple microstructures 40, 50 within each process unit, as shown in the embodiment of FIG. 10.

The microreactor 10 of FIG. 10 includes two process units 102, labeled 1 and 2, configured for operation in parallel. Again, process fluid feeds are omitted for ease of viewing. The microreactor 10 includes two thermal control fluid pumps 32, 34 and in this case each are connected via a respective thermal control fluid manifold 60, one of which further includes sub-manifolds 60A and 60B. The manifolds 60 (and sub-manifolds 60A, 60B) each provide thermal control fluid to two or more of the plurality of interconnected microstructures 40, 50. The thermal control fluid sub-manifolds 60A and 60B each include branches 62.

The thermal control passage or path or passage internal to the individual microstructures 40 and 50—such as path or passage 240 in the microstructure of FIGS. 1 and 2, or path or passage 348 in the microstructure of FIGS. 3 and 4, and combinations of such paths or passages in the microstructures of FIGS. 5 and 6—desirably has relatively low flow resistance, allowing for relatively high flow rates of thermal control fluid in a given microreactor.

Although flow resistance is desirably low, layer(s) 232 are also desirably of low height 233, generally in the range of 0.2 to 3 mm, desirably in the range of 0.2 to 1.5 mm, more desirably in the range of 0.5 to 1.0 mm, such that any boundary layers formed during thermal fluid flow are thin, preserving good thermal performance. Desirable low flow resistance may be achieved in significant part by the outlet hole 265 of FIGS. 1 and 2 having a diameter in the range of 1 to 10 mm, desirably 2 to 5 mm or more desirably 3 to 5 mm. The process fluid path 250 also is not large, desirably having a passage or path height 235 in the range of 0.1 to 2 mm, with the process fluid path 250 lying within a generally planar volume or layer 231. The thermal control fluid layer 232 may have an inlet hole 264 having a diameter in the same range as the outlet hole 265.

Where heat transfer rate must be maximized, the height 233 of the thermal fluid passages (the height of layers 232) should be kept small, such as in the range of 0.5-1.0 mm, for instance. Where heat transfer rate is not as critical, the height 233 can be increased for lower flow resistance in path 240 in the layers 232. Regardless of whether some flexibility in the height 233 is available, input and output port diameters are increased relative to previous work with this type of microstructure, thus providing the desired benefit of lower flow resistance even where high heat transfer rates are required.

Despite the relatively large diameters ports or holes 264, 265, as disclosed herein, the input and output ports or holes 264, 265 experience no significant increase, or even a slight decrease of stress, relative to previous devices with smaller apertures, thus providing at least the same pressure resistance performance as previously achieved. This has been demonstrated by experiments and by finite element modeling. Such enlarged diameters for input and output ports or holes may also be applied, if desired, in the process fluid path, that is, input and output ports or holes 282 and 283 may also desirably in the size range of from 1 to 10 mm in diameter, desirably 2 to 5 mm or more desirably 3 to 5 mm, allowing decreased flow resistance with at least the same pressure resistance within the process fluid path 250.

In a microreactor like that of FIG. 10, addition to decreasing the number of pumps required for thermal control fluid, it is also desirable to decrease the number of pumps required for process fluids. Because of the sensitivity of many reactions to small changes in stoichiometry, fluid balancing for process fluids can be critical.

Figure 11:
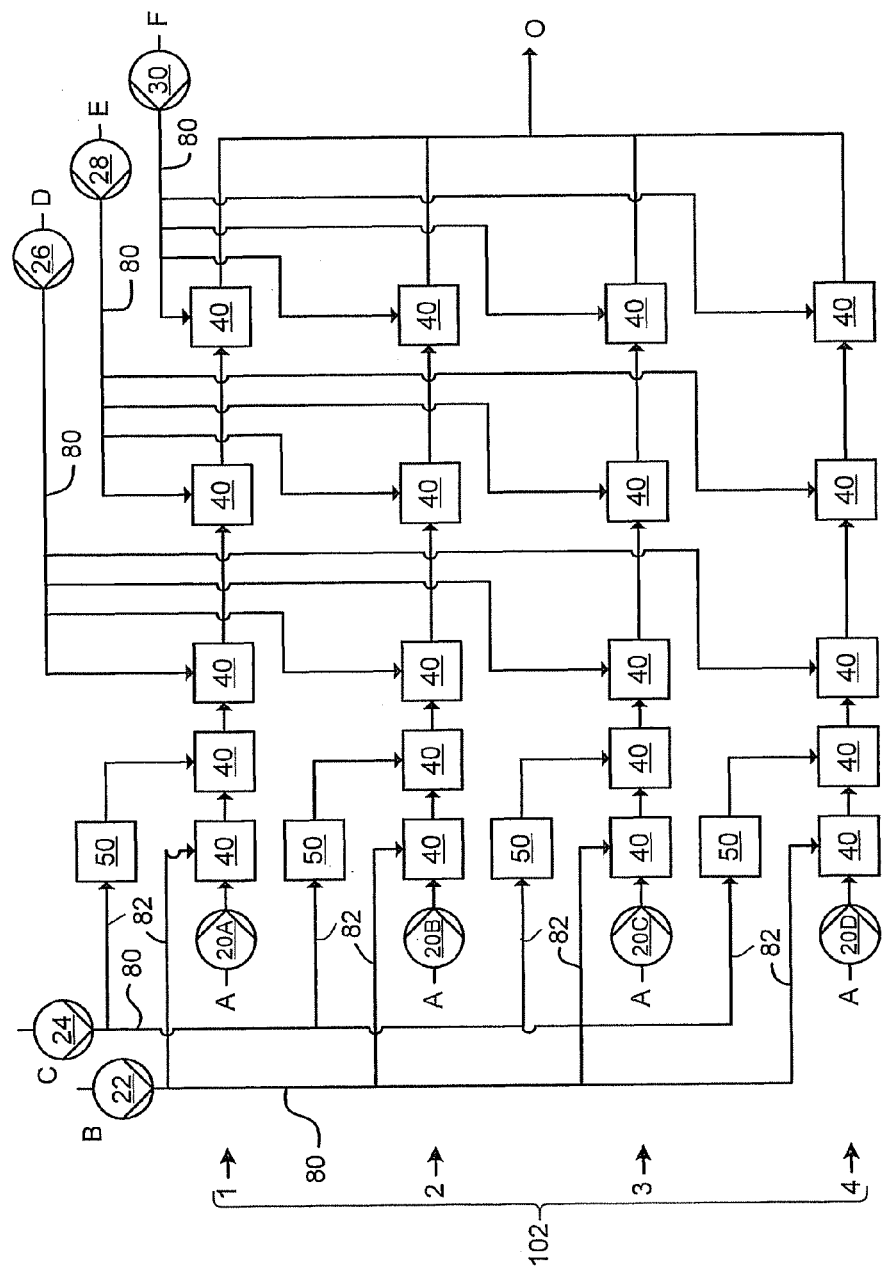
FIG. 11 is a schematic diagram of a microreactor or portion of a microreactor according to another aspect of the present invention and including four process units 102 arranged in parallel.

FIG. 11 shows another embodiment of a microreactor 10 according to the present invention. The microreactor 10 of FIG. 11 includes four process units 102 arranged in parallel and labeled 1-4. Only process fluid feed lines are shown. Thermal fluid feed lines are omitted for ease of viewing.

Figure 13:
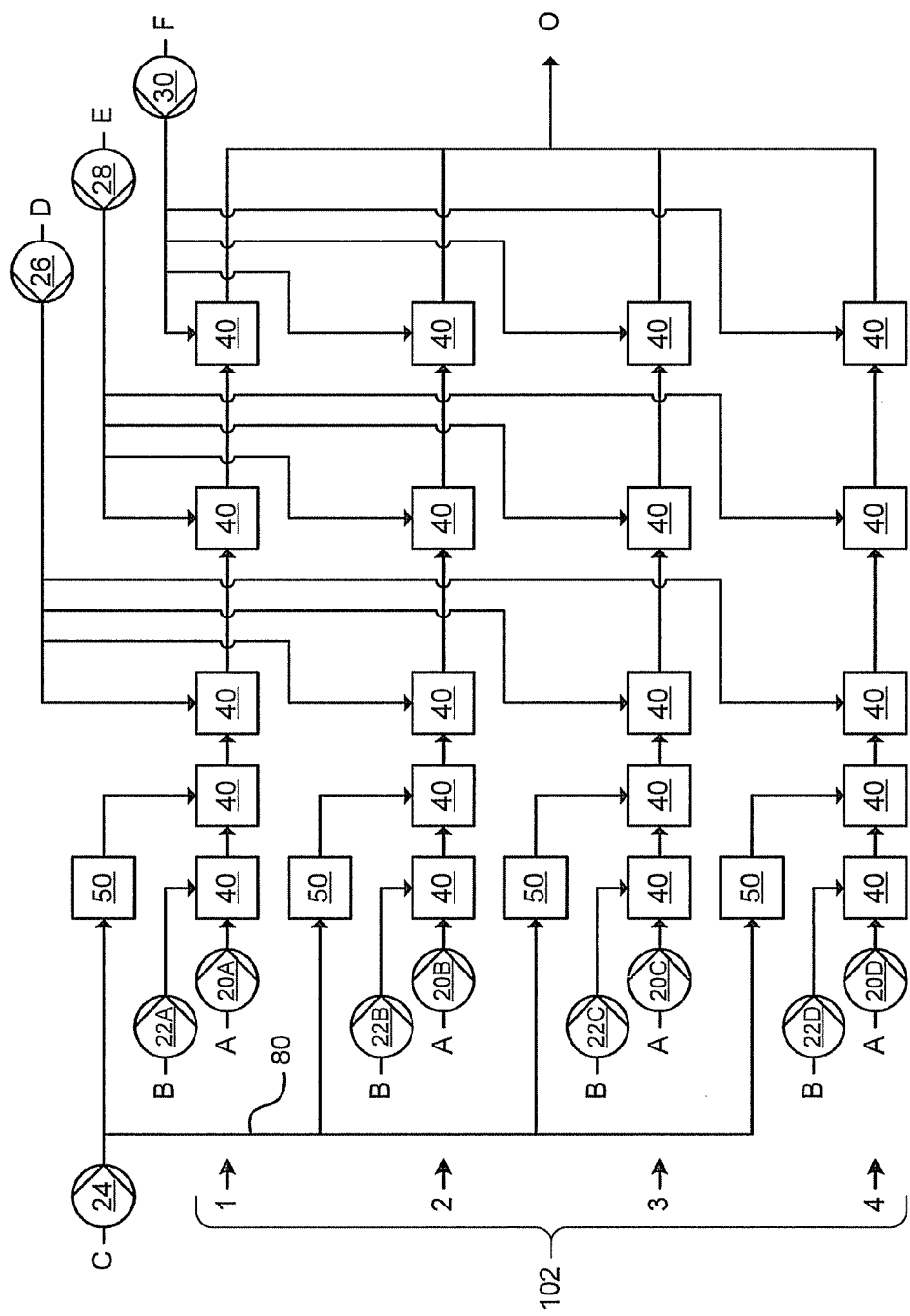
FIG. 13 is a schematic diagram of a microreactor or portion of a microreactor according to yet another aspect of the present invention according to which more than one of the process fluids is forced by non-manifolded pumps.

In the embodiment of FIG. 11, the process fluid feeds B-F are all pumped by a respective manifolded pump 22-30 connected across the four process units 102. Fluid balance is preserved to significant degree by having one process fluid, process fluid A in this case, pumped by non-manifolded pumps 20A-20D, one for each process unit 102. By forcing one of the process fluid flows to flow at ideal rates, and by using low-restriction manifolds 80, downstream variations within each process unit 102 are suppressed. Desirably, the very first or head-end process fluid, process fluid A in the figures, is the one that is forced, as in this case, or is at least one of those that is forced, as in FIG. 13 described below. In other words, it is desirable that a process fluid inlet (104) individually connected to respective non-manifolded fluid pumps is the inlet (104) for the head-end process fluid A.

Figure 12:
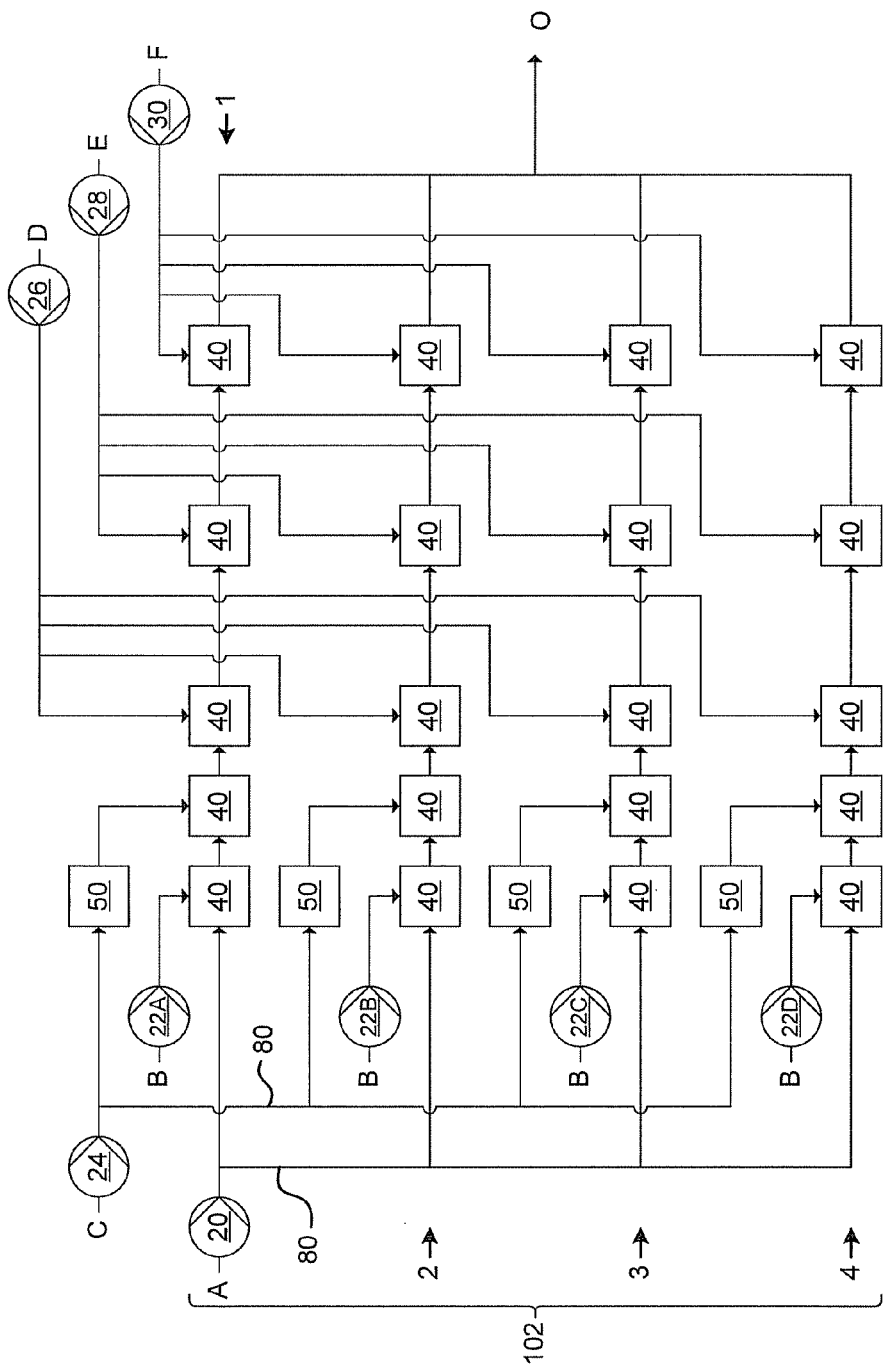
FIG. 12 is a schematic diagram of a microreactor or portion of a microreactor according to another aspect of the present invention according to which a different one of the process fluids is forced by non-manifolded pumps, relative to the embodiment of FIG. 11.

As an alternative to the embodiment of FIG. 11, a different one of the process fluids may be forced by non-manifolded pumps, as shown in FIG. 12. For example, a particularly low-flow-rate process fluid flow may be forced, or that fluid flow may be forced which produces the greatest variation of reaction performance or which otherwise has the greatest effect on the desired results. In the case that fluid B has a lower flow requirement than fluid A, for example, then the microreactor 10 of FIG. 12 could desirably be used to provide strict control of the introduction of fluid B. In the reactor of FIG. 12, so employed, a process fluid inlet (104) individually connected to respective non-manifolded fluid pumps is the inlet (104) for the process fluid B, desirably having a flow requirement less than that of fluid A. The fluid B inlet connected to non-manifolded pumps may be the only inlet so connected, or, as another alternative, two or more of the process fluids may be forced, as shown in the microreactor 10 of FIG. 13. In that microreactor 10, process fluids A (the head-end fluid) and B (a lower flow fluid, in the case of one desirable alternative) are both forced by respective non-manifolded pumps 20A-20D and 22A-22D. Other combinations are possible, of course.

Figure 14:
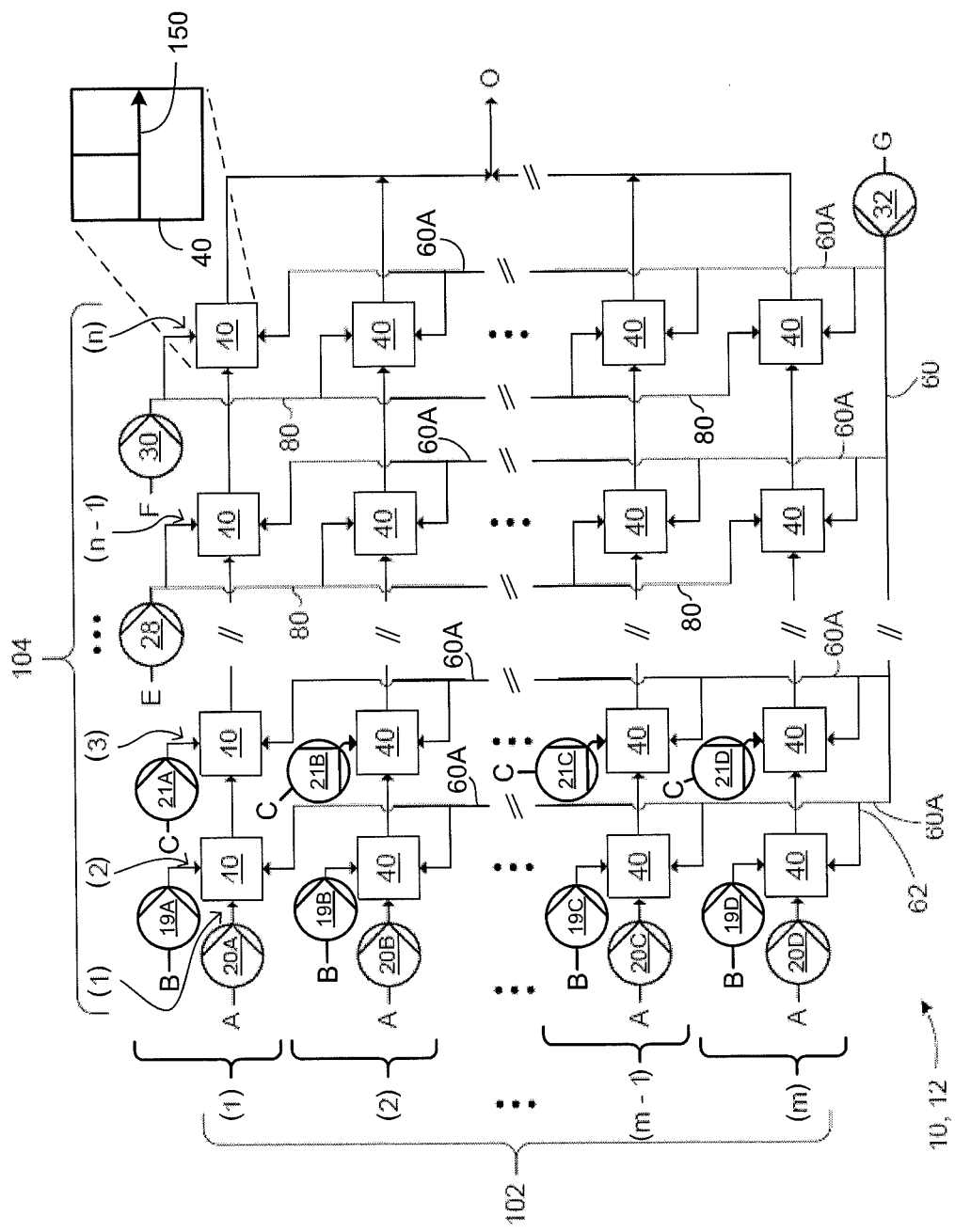
FIG. 14 is a partial schematic diagram of a microreactor or portion of a microreactor according to still another aspect of the present invention.

FIG. 14 shows a partial schematic diagram of a microreactor 10 according to the present invention including a number m of process units 102(1) to 102(m). The microreactor 10 comprises a plurality of interconnected microstructures 14 arranged in a number m of process units 102(1) to 102(m) (which appear as rows in the figure as labeled at left) with the process units 102(1) to 102(m) configured to be operable together in parallel, each of the m process units having a number n of respective process fluid inlets 104(1) to 104(n) (which are arranged in the figure as columns labeled at the top). Note that although the diagram is in rows and columns, this arrangement need have little to do with the actual physical layout of component according to the present invention. For example, the process units 102(1) to 102(m) need not be linear or single-branched or arranged in rows. What matters is that the relationships herein described, and understood with the aid of the Figure, hold. For each process unit 102(1) to 102(m), a number y of the n respective process fluid inlets 104(1) to 104(n) are connected individually to a respective non-manifolded fluid pump. In this specific case, three of the process fluid inlets, those inlets 104(1), 104(2) and 104(3) for process fluids A, B, and C at the left of FIG. 14, are connected individually to a respective non-manifolded pump (20A-20D for A, 19A-19D for B and 21A-21B for C). A number n−y of the n respective process fluid inlets 104(1) to 104(n)—at least two at the right of the figure in this case, inlets 102(n−1) and 102(n)) for process fluids E and F—are connected to respective manifolded fluid pumps (28, 30 in this case) via a manifold 80, wherein y may be an integer from 1 to n−1 inclusive. Desirably, the flow resistance, from a respective manifolded fluid pump along the associated manifold 80 to an associated microstructure 14, is smaller than the flow resistance of an associated process fluid path 150 through the associated microstructure(s) 14 (with process fluid path 150 corresponding, in various alternative embodiments, to process fluid paths 250 of FIG. 2, and 328 of FIG. 4, for example), or in other words, it is desirable that the manifold 80 be a low resistance manifold relative to the associated microstructure(s) 14. It is also desirable to minimize the number of individual pumps, so y is desirably only 1 or 2, and only as high as required to adequately control the desired reaction to be performed. The net result is that microstructures, including microstructures comprising glass, glass-ceramic and ceramic materials, may be used to perform highly complex and sensitive reactions in an externally-numbered-up microreactor, without requiring individual feed lines and pumps for every feed to every microstructure.

Figure 15:
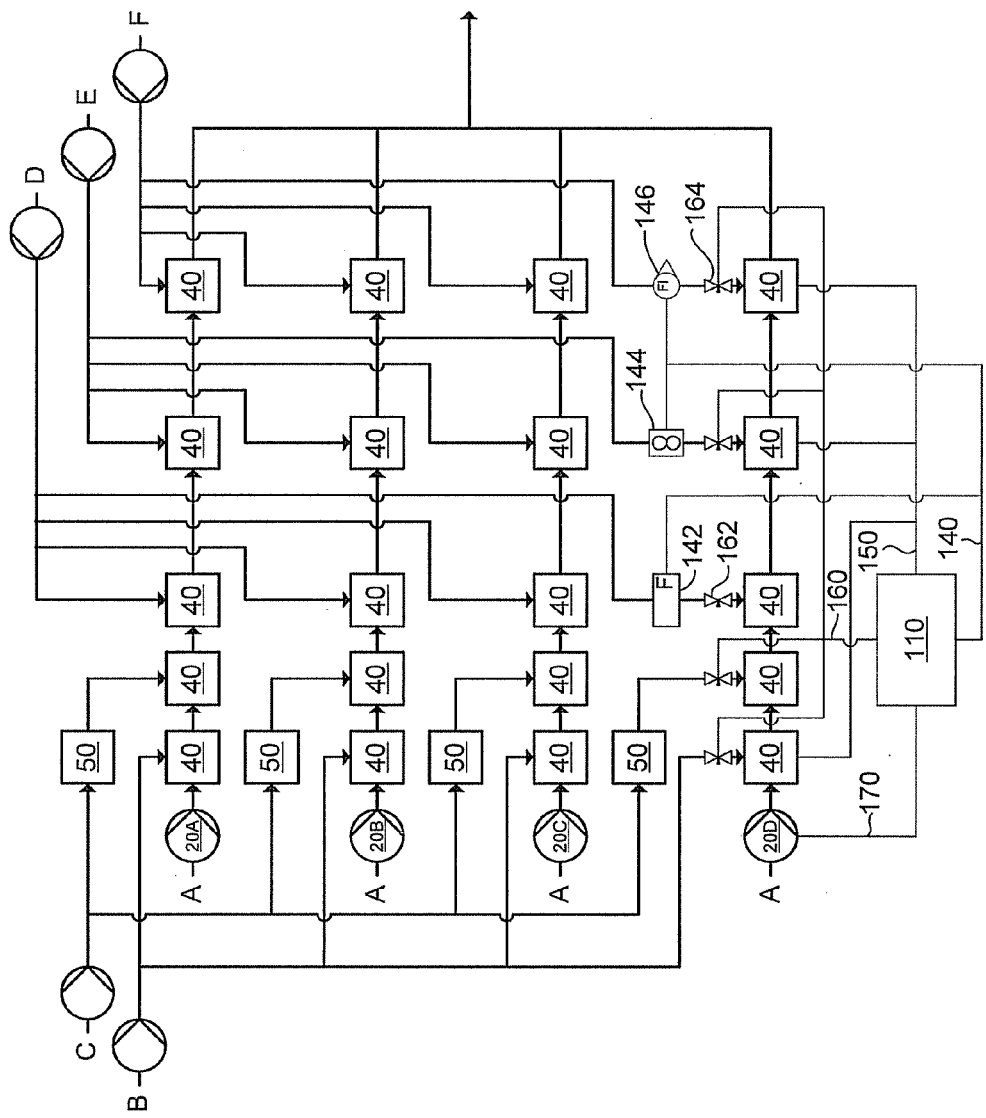
FIG. 15 is a schematic diagram of a microreactor or portion of a microreactor according to yet another aspect of the present invention according to which flow from one or both of non-manifolded pumps and manifolded pumps may be monitored and/or feedback controlled.

FIG. 15 is a schematic diagram of a microreactor or portion of a microreactor according to yet another aspect of the present invention according to flow from one or both of non-manifolded pumps and/or manifolded pumps may be monitored and/or feedback controlled. Where strictly passive flow splitting for flows from the manifolded pumps is insufficient to maintain the required flow balance, one or more flow monitors 142 of suitable type may be employed to monitor the outputs of one or more of the manifolded pumps. These may include, for example, a positive displacement flowmeter 144 or, desirably, a rotameter 146. The meter output may be monitored by an operator who may adjust a manual valve 162 to tune the flow balance of the microreactor. Alternatively, a control system computer, factory production control system, microprocessor or the like 110 may receive flow information via flow-information links 140, and may employ the information received in adjusting automatically controlled valves 164 via valve-control links 160. The control system computer, factory production control system, microprocessor or the like 110 may also receive various inputs from individual microstructures or sensors associated therewith, via process-information links 150, and may also automatically adjust the flow rate of the non-manifolded pumps such as pump 20D, via pump-control link 170. It is understood that such links need not be hard-wired.

The methods of use and/or the devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be preformed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization;

esterification; amidation; heterocyclic synthesis; dehydration; alcoholysis; hydrolysis; ammonolysis; etherification; enzymatic synthesis; ketalization; saponification; isomerisation; quatemization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A microreactor comprising:
a plurality of microstructures fluidically interconnected within process units,
one or more manifolds, and
a plurality of fluid pumps,
said microstructures each being microfluidic devices having internal passages with a characteristic cross-sectional dimension in the few-millimeter to sub-millimeter range, said microstructures further each having a process fluid path and being fluidically interconnected to form a plural number m of process units, said process units each being an interconnected network of microstructures arranged to as to be capable of performing a desired reaction or process along a single primary path along or through the microstructures, said process units further being fluidically interconnected in parallel, each of the m process units having a plural number n of respective process fluid inlets, wherein a number y of the n respective process fluid inlets of each process unit m are connected individually to respective first fluid pumps of the plurality of fluid pumps, and wherein a number n–y of the n respective process fluid inlets are connected to a respective second fluid pump of the plurality of fluid pumps via a respective manifold, wherein y is an integer from 1 to n–1 inclusive, and further wherein a flow resistance, from the respective second fluid pump along the manifold to one of the number n–y of the n respective process fluid inlets is smaller than a flow resistance of a process fluid path through a microstructure fluidically connected to the one of the number n–y of the n respective process fluid inlets.

2. The microreactor according to claim 1, wherein the microreactor comprises at least one thermal control fluid pump and a thermal control fluid manifold, the thermal control fluid pump being connected via the thermal control fluid manifold to two or more of the plurality of interconnected microstructures.

3. The microreactor according to claim 2 wherein the two or more of the plurality of interconnected microstructures include a thermal control fluid outlet hole having a diameter in the range of 1 to 10 mm.

4. The microreactor according to claim 3 wherein the two or more of the plurality of interconnected microstructures include a thermal control fluid outlet hole having a diameter in the range of 2 to 5 mm.

5. The microreactor according to claim 3 wherein the two or more of the plurality of interconnected microstructures include a thermal control fluid inlet hole having a diameter in the range of 3 to 5 mm.

6. The microreactor according to claim 1 wherein the microstructures comprise at least one of glass, ceramic, and glass ceramic.

7. The microreactor according to claim 1 wherein the microstructures include at least one multilayer microfluidic device.

8. The microreactor according to claim 1 wherein the microstructures include at least one honeycomb-body based microfluidic device.

9. The microreactor according to claim 1 wherein y is 2.

10. The microreactor according to claim 1 wherein y is 1.

11. The microreactor according to claim 1 wherein the respective process units each have a head end at which process fluid flows begin and wherein at least one process fluid inlet of the number y of the n respective process fluid inlets individually connected to the respective first fluid pumps is positioned at a head end of a process unit.

12. The microreactor according to claim 1 wherein the respective process units each have a head end at which process fluid flows begin and wherein at least one process fluid inlet of the number y of the n respective process fluid inlets individually connected to the respective first fluid pumps is not positioned at a head end of a process unit.

13. The microreactor according to any of claim 1 further comprising one or more flow meters for monitoring flow rates in the outputs of a respective manifolded fluid pump.

14. A method of tuning the flow balance of a microreactor comprising the steps of:
providing a microreactor according to claim 1, the microreactor further comprising one or more flow meters and one or more manual valves;
monitoring the one or more flow meters; and
adjusting the one or more manual valves to tune the flow balance of the microreactor.

* * * * *